(12) United States Patent
Renner (10) Patent No.: US 8,419,582 B2
(45) Date of Patent: Apr. 16, 2013

(54) DUAL-CLUTCH GROUP TRANSMISSION AND METHOD FOR ACTUATING A DUAL-CLUTCH GROUP TRANSMISSION

(75) Inventor: Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/637,384

(22) PCT Filed: Mar. 2, 2011

(86) PCT No.: PCT/EP2011/053086
§ 371 (c)(1),
(2), (4) Date: Sep. 26, 2012

(87) PCT Pub. No.: WO2011/128148
PCT Pub. Date: Oct. 20, 2011

(65) Prior Publication Data
US 2013/0023375 A1   Jan. 24, 2013

(30) Foreign Application Priority Data
Apr. 13, 2010   (DE) .................. 10 2010 003 924

(51) Int. Cl.
F16H 48/06   (2006.01)
(52) U.S. Cl.
USPC ................. 475/221; 74/330; 74/331
(58) Field of Classification Search ............ 74/329–331, 74/339; 475/220, 221, 329
See application file for complete search history.

(56) References Cited

U.S. PATENT DOCUMENTS

| | | | | |
|---|---|---|---|---|
| 5,353,661 | A * | 10/1994 | Ordo | 74/331 |
| 7,914,412 | B2 | 3/2011 | Gitt | |
| 8,038,564 | B2 * | 10/2011 | Earhart et al. | 475/218 |
| 2008/0188342 | A1 | 8/2008 | Jackson | |
| 2009/0095101 | A1 * | 4/2009 | Gitt | 74/331 |
| 2010/0218643 | A1 | 9/2010 | Gitt et al. | |
| 2011/0259147 | A1 | 10/2011 | Hoffmann | |
| 2012/0115674 | A1 * | 5/2012 | Ikegami | 477/3 |

FOREIGN PATENT DOCUMENTS

| | | |
|---|---|---|
| DE | 10133629 A1 | 1/2003 |
| DE | 10 2006 015 661 A1 | 10/2007 |
| DE | 10 2007 047 671 A1 | 4/2009 |
| DE | 10 2008 001 200 A1 | 10/2009 |
| DE | 10 2008 054 477 A1 | 6/2010 |
| EP | 2149725 A2 | 2/2010 |

OTHER PUBLICATIONS

International Search Report Corresponding to PCT/EP2011/053086.
Written Opinion Corresponding to PCT/EP2011/053086.

* cited by examiner

Primary Examiner — Justin Holmes
(74) Attorney, Agent, or Firm — Davis & Bujold, PLLC (57) ABSTRACT

A dual-clutch group transmission having splitter, main and range groups. The range group is a planetary transmission with a ring gear, a sun gear and planetary gears that are supported by a carrier. Inner and outer transmission input shafts are connected to a respective first and second clutch. A main transmission shaft and shifting elements for engaging gears or forming frictional connections. Power-gearshifts, involving a shift of the range group, are enabled because the inner input shaft can be directly connected, via a shift element, to the main shaft. A hollow shaft extends coaxially over the main shaft and supports a loose wheel of a forward gear of the main group. The wheel can be rotationally fixed, via a shift element, to the hollow shaft which can be connected to the main shaft and the carrier by respective shifting elements.

8 Claims, 4 Drawing Sheets

Fig. 1

| GEAR | MOTOR CLUTCH | | SHIFTING ELEMENTS/GEAR COUPLING | | | | | | | | | | |
|---|---|---|---|---|---|---|---|---|---|---|---|---|---|
| | | | S1 | | S2 | | S3 | | S4 | | S5 | S6 | |
| | C1 | C2 | K1 | K2 | K3 | HW | 2G | HoW | 1G | RG | PT/GPS | GPL | GPS |
| 1 |  | X | X |  |  |  |  |  |  |  |  | X |  |
| 2 | X |  |  |  | X |  |  | X | X |  |  | X |  |
| 3 |  | X | X |  |  |  |  | X | X |  |  | X |  |
| 4 |  | X |  |  |  |  | X | X |  |  |  | X |  |
| 5 | X |  |  | X |  |  | X |  |  |  |  | X |  |
| 6 |  | X | X |  |  |  | X |  |  |  |  | X |  |
| 7 | X |  |  |  | X | X |  |  |  |  |  | X |  |
| 8 |  | X |  | X |  |  |  |  | X |  | X |  |  |
| 9 | X |  |  |  | X |  |  | X | X |  | X |  |  |
| 10 | X |  |  |  |  |  |  | X | X |  | X |  |  |
| 11 |  | X | X |  |  |  | X |  |  |  |  |  | X |
| 12 | X |  |  | X |  |  | X |  |  |  |  |  | X |
| 13 |  | X | X |  |  |  | X |  |  |  |  |  | X |
| 14 | X |  |  |  | X | X |  |  |  |  |  |  | X |

| GEAR | MOTOR CLUTCH | | SHIFTING ELEMENTS/GEAR COUPLING | | | | | | | | | |
|---|---|---|---|---|---|---|---|---|---|---|---|---|
| | | | S1 | | S2 | | S4 | | S5 | | S6 | |
| | C1 | C2 | K1 | K2 | K3 | HW | 1G | RG | HW | PT/GPS | GPL | GPS |
| 1 |   | X | X |   |   |   | X |   | X |   |   |   |
| 2 | X |   |   | X |   |   | X |   | X |   | X |   |
| 3 |   | X |   |   | X |   | X |   | X |   | X |   |
| 4 | X |   |   |   |   | X |   |   |   |   | X |   |
| 5 |   | X | X |   |   |   | X |   |   | X |   |   |
| 6 | X |   |   |   | X |   | X |   |   | X |   |   |
| 7 |   | X |   | X |   |   | X |   |   | X |   |   |
| 8 | X |   |   |   |   | X |   |   |   |   |   | X |

Fig. 4

DUAL-CLUTCH GROUP TRANSMISSION AND METHOD FOR ACTUATING A DUAL-CLUTCH GROUP TRANSMISSION

This application is a National Stage completion of PCT/EP2011/053086 filed Mar. 2, 2011, which claims priority from German patent application serial no. 10 2010 003 924.1 filed Apr. 13, 2010.

FIELD OF THE INVENTION

The invention concerns a dual clutch group transmission and a method for actuating a dual clutch group transmission.

BACKGROUND OF THE INVENTION

Group transmissions and dual clutch transmissions are known transmission types. Moreover, group transmissions that comprise a dual clutch are also known.

Group, or multi-group transmissions have the advantages that by combining two or three transmission groups they provide a large number of gears, they operate efficiently, and with regard to their number of gears they can be produced in a structurally compact form. However, in common with all manual or automated variable-speed transmissions they are inherently associated with an interruption of the traction force. In contrast, dual clutch transmissions have the advantage that over a sequential series of shifts, in which in each case a gear associated with one of the clutches is active while a connection gear associated with the other clutch has been preselected, they can basically be power-shifted, i.e. they enable gearshifts that are largely free from traction force interruption and therefore provide a high level of driving comfort.

Accordingly a combination of both transmission types seems appropriate, particularly in commercial vehicles such as long-haul trucks, which must have, on the one hand, a large number of gears with a corresponding transmission spread and, on the other hand, a high level of driving comfort along with high operational reliability. However, in transmissions designed in such manner not all the gears can necessarily be power-shifted. When, as is usual, the group transmission has an input or splitter group and a main group of countershaft configuration as well as a downstream range group of planetary design, such that the range group can be shifted between two gear ranges, then it is true that in accordance with the torque flow of the successive gears most of the gears within the two gear ranges can, with the help of the dual clutch, be made as power-shifting gears. However, the shifting process of the range group itself is as a rule not traction-force-supported. Since in addition the shifting process lasts a comparatively long time, this is regularly sensed by the driver and perceived as annoying.

In the not previously published DE 10 2008 054 477 A1 by the present applicant a multi-group transmission is proposed, which enables traction-force-supported gearshifts. This multi-group transmission has an input-side splitter group with three gear constants, a three-gear main group and a downstream range group. The splitter group and the main group are configured in a space-saving and load-distribution-balanced manner with two common, axis-parallel countershafts. The range group is formed as a planetary transmission with a central sun gear, a planetary gearset guided by a planetary carrier and an outer ring gear. By means of a starting clutch a transmission input shaft can be connected at one end to a driveshaft of a drive motor. At its other end the transmission input shaft can be directly connected by means of a shifting element, i.e. without branching via the countershafts, to a main transmission shaft arranged axially behind it. At its output end the main transmission shaft is connected fixed to the sun gear of the range group. Furthermore, a power-shift clutch is provided, by means of which a loose wheel mounted to rotate on the transmission input shaft and belonging to the first gear constant nearest to the motor can be connected to the drive input shaft, so that the power-shift clutch bridges across the starting clutch. The starting clutch and the power-shift clutch can for example be made as a dual clutch whose common clutch cage is connected to the drive input shaft.

Thanks to the fact that the first input constant can be engaged regardless of the shift condition of the starting clutch, and to the possibility of connecting the transmission input shaft directly to the main transmission shaft, it is possible to select at one and the same time a direct and a branched power path and by means of an overlapping opening and closing of the two clutches, to have one merge into the other in the drive-power flow. It is true that in this way a number of powered gearshifts are possible with this transmission. However, a shift of the downstream range group between a lower gear range stepped down by the planetary transmission and an upper gear range not stepped down due to blocking of the planetary transmission, is not traction-force-supported.

From DE 10 2008 001 200 A1 another traction-force supporting multi-group transmission with a splitter group, a main group and a range group as well as a dual clutch is known. In this case one clutch is used as a starting clutch to connect a driveshaft of a drive motor to a transmission input shaft and the other clutch is used as a power-shift clutch for engaging an intermediate gear by connecting the driveshaft with a main transmission shaft that passes through the transmission groups. The transmission input shaft is in the form of a hollow shaft arranged coaxially over the main transmission shaft. During a gearset the power-shift clutch is closed and thereby an intermediate gear is engaged, without disengaging the starting clutch. By virtue of the direct connection of the driveshaft to the main transmission shaft, the intermediate gear corresponds to the direct gear of the splitter group and the main group. In this case the power-shift clutch operating with slip supports the motor torque at the drive output of the vehicle, whereby the motor speed is synchronized. Due to the torque support a break in traction-force during a neutral setting of the splitter group and/or the main group during a change from the original gear to the target gear, is prevented.

If in the usual way the main transmission shaft is connected at its output-side end directly to a sun gear of the range group but only indirectly to a transmission output shaft at the output of the range group, then during a shift of the range group in which the force flow changes, for example, between a coupling of a ring gear to a housing and a coupling of the ring gear to a transmission output shaft connected to a planetary carrier, the intermediate gear cannot provide any traction-force support. In this connection DE 10 2008 001 200 A1 proposes a means of assistance in that the main transmission has an additional hollow shaft which is arranged coaxially on the main shaft and on which the loose wheels and associated shifting elements of the main transmission are arranged. Instead of the main transmission shaft, it is this hollow shaft which at its output-side end is connected to the sun gear, whereas the main transmission shaft passes uncoupled through the range group and is connected directly to the transmission output shaft. Thus, range shifts can also be traction-force-supported by temporary engagement of the direct gear of the transmission as a whole as an intermediate gear during a gearshift. However, the range group itself can still not be power-shifted. Accordingly, in transmission designs that do not provide for any intermediate gear engagement, the range shift is again not traction-force-supported. Furthermore, the hollow shaft that extends as far as the sun gear is relatively long, so the mounting of the very long main transmission shaft passing through the hollow shaft and extending from the starting clutch to the transmission output, rather falls short of optimum.

SUMMARY OF THE INVENTION

Against this background the purpose of the present invention is to propose a dual-clutch group transmission with a splitter group and a main group of countershaft configuration and a range group of planetary design, which enables power-shift gear changes, especially when the range group is shifted, and in which the transmission shafts are comparatively short. In addition a method is described for operating such a transmission, which offers a high level of shifting and driving comfort when the range group is shifted.

The invention is based on the realization that in a group transmission with a dual clutch, having two motor clutches for connecting, in each case, a transmission input shaft to a drive motor, and which comprises an upstream splitter group, a main group of countershaft design and a downstream range group of planetary design, with the help of a transmission structure that enables a direct connection between a first transmission input shaft and a main transmission shaft and independently of this a functional connection between a second transmission input shaft and a planetary carrier of the range group, a gearshift can be carried out with a coupling change of the planetary transmission components under load, i.e. without detectable interruption of the traction force.

Accordingly the invention starts from a dual-clutch group transmission with a splitter group, a main group and a range group arranged one after another in a drive-train, in which the splitter group and the main group are formed as countershaft transmissions with at least one common countershaft and with a number of gear constants or gears, in which the range group is in the form of a planetary transmission with a radially outer ring gear, a central sun gear and a planetary gearset rolling between them, wherein the planetary gearwheels are guided by a planetary carrier, with a first, inner transmission input shaft connected to a first clutch on the input side, with a second, outer transmission input shaft arranged as a hollow shaft coaxially over the inner transmission input shaft and connected to a second clutch on the input side, with a main transmission shaft arranged axially behind the transmission input shafts and connected to the sun gear, with a transmission output shaft arranged axially behind the main transmission shaft and connected on the output side to the planetary carrier, and with shifting elements for shifting gears or for producing frictional connections.

To achieve the set objective the invention envisages that the inner transmission input shaft can be directly connected, via a shifting element, to the main transmission shaft, an additional hollow shaft is arranged coaxially over the main transmission shaft, on the hollow shaft at least one loose wheel of a forward gear of the main group is mounted to rotate, which can be connected to the hollow shaft by means of a shifting element, and the hollow shaft can be connected by a shifting element to the main transmission shaft and by another shifting element to the planetary carrier.

Since the driveshaft of the drive motor can be directly connected by means of the inner transmission input shaft to the main transmission shaft, a second power train that can be engaged independently of this power train is provided by way of the then freely rotating countershafts, which are not connected to the driveshaft and the main transmission shaft. The arrangement according to the invention is realized by a second hollow shaft to which the planetary carrier of the range group can be directly connected, whereby a frictional connection between the planetary carrier and the driving outer transmission input shaft can be formed.

Thus, the arrangement according to the invention advantageously makes it possible, on the one hand, to form geared frictional connections independently of one another by way of the main group and the splitter group between the outer transmission input shaft and the transmission output shaft, and on the other hand, to form direct frictional connections between the inner transmission input shaft and the main transmission shaft and sun gear of the range group, with subsequent selective gearing of the range group in a lower gear range or blocking of the range group in an upper gear range.

Furthermore, the invention starts from a method for operating a dual-clutch transmission with a splitter group, a main group and a range group arranged axially one after another in a drive-train, in which the splitter group and the main group are formed as countershaft transmissions with at least one common countershaft and with a plurality of gear constants or gears, and in which the range group is formed as a planetary transmission with a radially outer ring gear, a central sun gear and a planetary gearset rolling between them, wherein the planetary gearwheels are guided by a planetary carrier, and with a first, inner transmission input shaft connected to a first clutch on the input side, a second, outer transmission input shaft arranged coaxially over the inner transmission input shaft and connected to a second clutch on the input side, with a main transmission shaft arranged axially behind the transmission input shafts and connected to the sun gear, with a transmission output shaft arranged axially behind the main transmission shaft and connected on the output side to the planetary carrier, and with shifting elements for shifting gears or for producing frictional connections.

To achieve the stated objective in relation to method, the invention envisages that in a gearshift in which a shifting process of the range group is involved, the target gear or the original gear is connected to the planetary carrier by a frictional connection formed independently of the main transmission shaft by means of a hollow shaft arranged coaxially over the main transmission shaft.

In particular it can be provided that at the same time, a direct gear of the countershaft transmission can be preselected by engaging a rotationally fixed direct connection of the inner transmission input shaft to the main transmission shaft, and a gear adjacent to this direct gear can be preselected by engaging rotationally fixed connections of a loose wheel of a driving gear constant to the outer transmission input shaft, a loose wheel of a driven forward gear to the hollow shaft, and the planetary carrier to the hollow shaft.

For example, in an upshift from a direct gear in the lower gear range, i.e. from the highest gear of the lower gear range, to the next higher gear, i.e. to the lowest gear of the upper gear range, this enables a power-shifted and comfortable gearshift with a shift of the range group. Thus, in such an upshift, while the direct gear in the lower gear range is engaged before the shift of the range group by directly connecting the inner transmission input shaft to the main transmission shaft and closing the associated input clutch, the hollow shaft according to the invention on the main transmission shaft is engaged with the planetary carrier and a gearwheel or a loose wheel, preferably of the 1st gear. Thereby, the outer transmission input shaft is functionally connected to the transmission output shaft. In that case a shifting element for shifting the range group, with which the force flow is switched between a coupling of the ring gear to a housing component for the geared lower gear range or a coupling of the ring gear to the planetary carrier for the upper gear range in which the planetary transmission is blocked, can be shifted to neutral. For the subsequent power-shifted gearshift it is only necessary to open the closed input clutch and close the other input clutch in an overlapped manner. Thus, the shift by way of the range group is no longer perceived by the driver as disturbing, which therefore increases the driving comfort.

Furthermore it can be provided that the splitter group has three gear constants, of which a first and a second gear constant are arranged on the outer transmission input shaft and the third gear constant on the inner transmission input shaft, and that the main group has two forward gears and one reverse gear, of which the first gear and the reverse gear are arranged on the hollow shaft and the second gear is arranged on the main shaft.

In this case it can be provided that the hollow shaft can on the one hand be connected in a rotationally fixed manner to the planetary carrier by means of a shifting element arranged on the hollow shaft, that can be actuated on one side, and on the other hand it can be connected to the main transmission shaft by means of a shifting element arranged on the main transmission shaft that can be actuated on one or both sides.

This transmission structure provides a total of fourteen forward gears with power-shifting of the range group, such that the seventh gear can be engaged as a direct gear in the lower gear range and the fourteenth gear as a direct gear in the upper gear range, and gears eight, nine and ten can be engaged by way of the planetary carrier. The fourteen-gear transmission enables a relatively large overall spread and particularly efficient driving operation in the commercial vehicle sector.

In addition a second transmission structure can be envisaged, in which the splitter group has three gear constants of which a first and a second gear constant are arranged on the outer transmission input shaft and the third gear constant on the inner transmission shaft. In this transmission structure the main group has one forward gear and one reverse gear, which are arranged on the additional hollow shaft, and the range group can be shifted between a lower, geared gear range and an upper, direct gear range.

Moreover this second transmission structure preferably comprises a shifting element that can be actuated on both sides and is arranged on the main transmission shaft, so that the hollow shaft can be connected for example, on the one hand, to the planetary carrier and, on the other hand, to the main transmission shaft.

The second transmission structure has a total of eight forward gears with power-shifting of the range group, wherein the fourth gear can be engaged as a direct gear in the lower range group and the eighth gear as a direct gear in the upper gear range, and gears five, six and seven can be engaged by way of the planetary carrier. Compared with the transmission with fourteen gears, one shifting element can be saved so that an even shorter axial length of the transmission and a saving of weight can be achieved. In a transmission having the second transmission structure, all the gears can be power-shifted.

BRIEF DESCRIPTION OF THE DRAWINGS

To clarify the invention the description of a drawing of an example embodiment is given below. The drawings show.

DETAILED DESCRIPTION OF THE PREFERRED EMBODIMENTS

Figure 1:
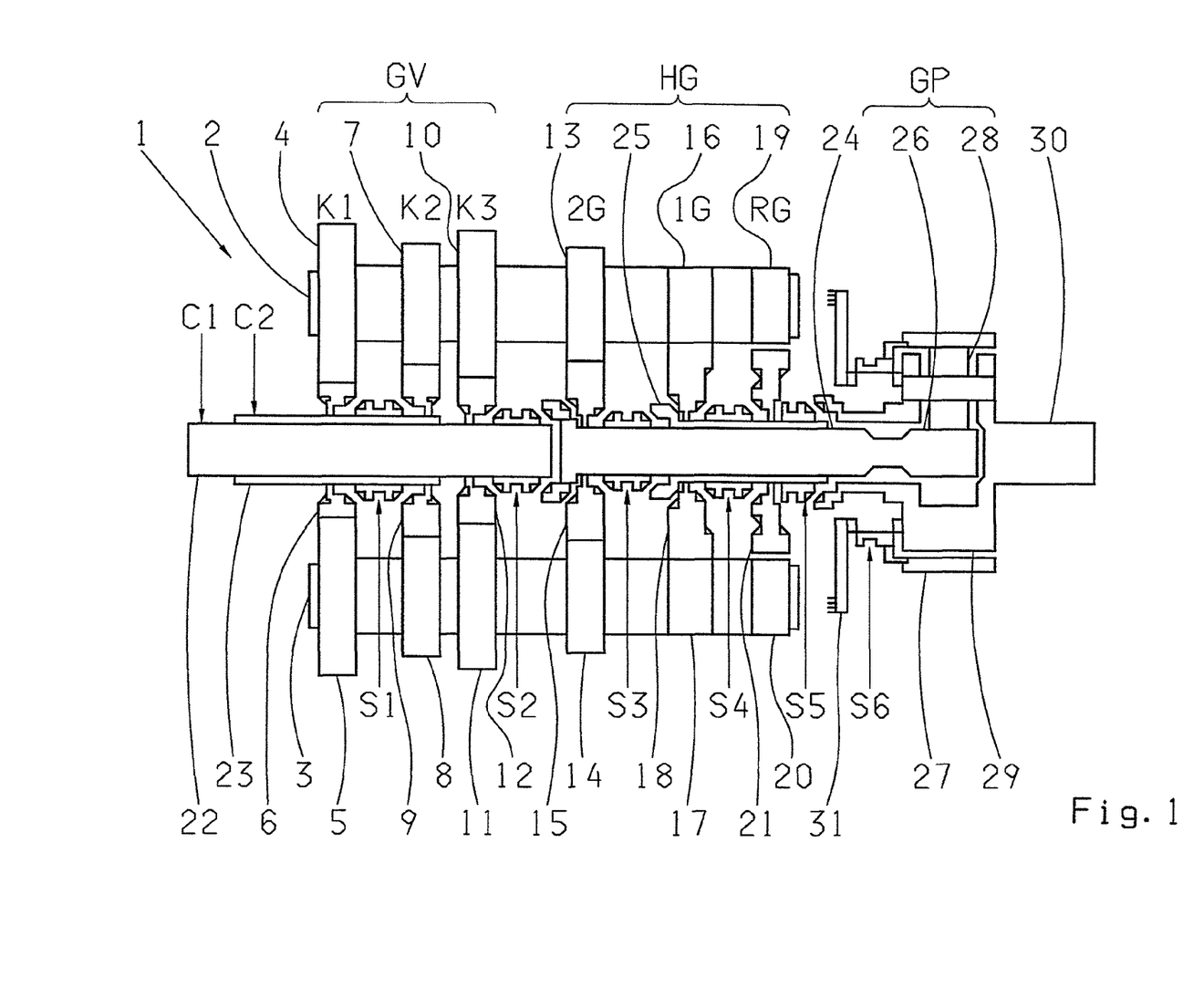
FIG. 1: A first transmission structure of a dual-clutch group transmission according to the invention with fourteen gears.

Accordingly, FIG. 1 is a schematic representation of a first transmission structure 1 of a dual-clutch group transmission as can be provided, for example, for a truck. The transmission structure 1 comprises three transmission groups GV, HG, GP. A splitter group GV on the input side with three input constants K1, K2, K3, a main group HG with a first gear 1G, a second gear 2G and a reverse gear RG, and a range group GP with a lower gear range GPL and an upper gear range GPS are arranged axially one after another.

The splitter group GV and the main group HG are formed as countershaft transmissions with two common, axis-parallel countershafts 2, 3. The gear constants K1, K2, K3 and the gears 2G, 1G, RG comprise gearsets, each with two fixed wheels 4, 5; 7, 8; 10, 11; 13, 14; 16, 17; 19, 20, which are arranged on the countershafts 2, 3 and each of which engages with a loose wheel 6, 9, 12, 15, 18 and 21 respectively, these being mounted to rotate and engaging with the associated pair of fixed wheels 4/4, 5; 7, 8; 10, 11; 13, 14; 16, 17; 19, 20. The gearset of the reverse gear RG also comprises two intermediate wheels (not shown) mounted to rotate so as to reverse the rotational direction. Since this countershaft structure is known per se, it is not necessary to describe the individual fixed and loose wheels in detail.

The loose wheel 12 of the gear constant K3 of the splitter group farthest from the motor is arranged on a first, inner transmission input shaft 22 which is connected to a first motor clutch C1 on the input side. The loose wheels 6 and 9 of the two gear constants K1, K2 near the motor are arranged on a second, outer transmission input shaft 23, which is connected to a second motor clutch C2 on the input side. The outer transmission input shaft 23 is made as a shorter, hollow shaft arranged coaxially over the inner transmission input shaft 22. The two motor clutches C1, C2 are indicated only by arrows in FIG. 1. They form a controllable dual clutch of known design, for producing a frictional connection of the transmission input shaft 22, 23 concerned to a drive motor (not shown).

The main group HG is associated with a main transmission shaft 24. On the main transmission shaft 24 is arranged the loose wheel 15 of the second gear 2G of the main group HG. In addition, according to the invention a hollow shaft 25 is arranged coaxially over the main transmission shaft 24. On this hollow shaft are arranged the loose wheels 18, 21 of the first gear 1G and the reverse gear RG.

The range group GP is arranged axially behind the main group HG, and has a central sun gear in fixed connection with the end of the main transmission shaft 24 remote from the motor, an outer ring gear 27 and, between the ring gear 27 and the sun gear 26, a rolling planetary gearset 28 whose planetary gears are guided by a planetary carrier 29. The output side of the planetary carrier is connected to a transmission output shaft 30.

To shift the gears or form frictional connections, a total of six shifting elements or gear clutches S1, S2, S3, S4, S5, S6, preferably with synchronizers, are provided.

The first shifting element S1 is arranged on the outer transmission input shaft 23 and can be actuated on both sides. Optionally, it forms a rotationally fixed connection of the loose wheel 6 of the first gear constant K1 or the loose wheel 9 of the second gear constant K2 to the outer transmission input shaft 23.

The second shifting element S2 is arranged on the inner transmission input shaft 22 and can also be actuated on both sides. Optionally, it forms a rotationally fixed connection of the loose wheel 12 of the third gear constant K3 to the inner transmission input shaft 22 or a direct connection between the inner transmission input shaft 22 and the end of the main transmission shaft 24 nearest the motor.

The third shifting element S3 is arranged on the main transmission 24 and can again be actuated on both sides. Optionally, it forms a rotationally fixed connection of the loose wheel 15 of the second gear 2G of the main group HG to the main transmission shaft 24, or a rotationally fixed connection between the main transmission shaft 24 and the end of the hollow shaft 25, arranged on it, nearest the motor.

The fourth shifting element S4 is arranged on the hollow shaft 25 and can also be actuated on both sides. Optionally, if forms a rotationally fixed connection of the loose wheel 18 of the first gear 1G of the main group HG, or of the loose wheel 21 of the reverse gear RG, to the hollow shaft 25.

The fifth shifting element S5 is also arranged on the hollow shaft 25 and can be actuated on one side. Optionally, it forms a rotationally fixed connection between the end of the hollow shaft 25 remote from the motor and the planetary carrier 29 of the range group GP.

The sixth shifting element S6 is associated with the range group GP. Optionally, it couples the ring gear 27 to a housing component 31 for a geared lower gear range GPL corresponding to the planetary gearset 28, or couples the ring gear 27 to the planetary carrier 29, whereby the range group GP is blocked and rotates together with the transmission output shaft 30 at the speed of the main transmission shaft 24, i.e. in an upper gear range GPL with the direct ratio 1:1.

By virtue of the combination of the threefold splitter GV with the two-gear main group HG and the range group GP, fourteen forward gears can be engaged. The shift sequence and the respective shifting elements S1, S2, S3, S4, S5, S6 actuated can be seen from the gear table in FIG. 2.

Figure 2:
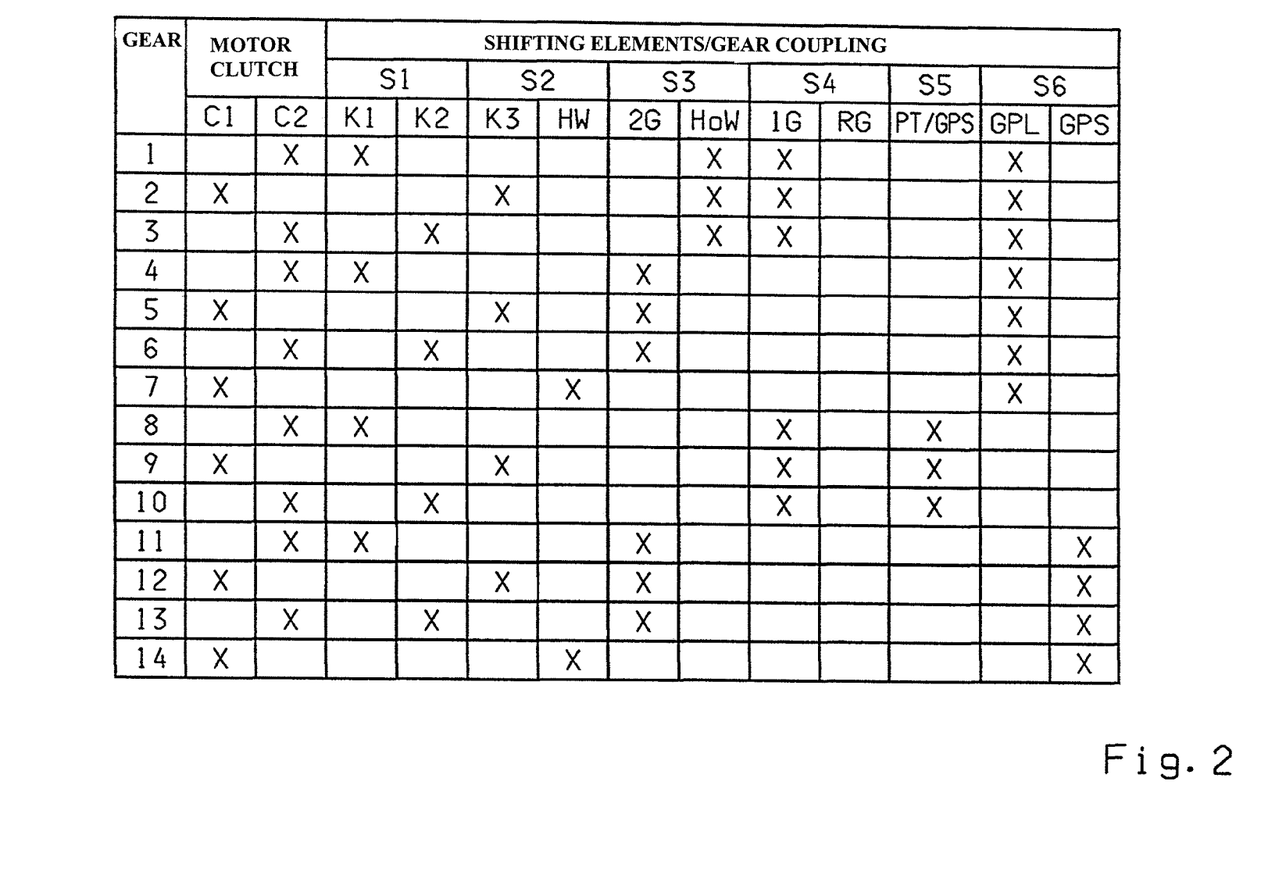
FIG. 2: A gear table for the fourteen-gear transmission structure.

The first column of the gear table of FIG. 2 shows the respective gears. The next two columns show the input clutch C1, C2 closed in each case. The shift positions are in each case marked with an "X" in the columns of the gear constants K1, K2, K3, gears 1G, 2G, and frictional connections HW (main shaft 24), HoW (hollow shaft 25) and PT (planetary carrier 29). The last two columns show the respective coupling position of the shifting element S6 of the range group GP. The lower gear range corresponds to shift position GPL and the upper gear range corresponds to shift position GPS. The shift position of the shifting element S5 also corresponds to the upper gear range, and in this shift position the shifting element S6 is redundant. The reverse gear ratios associated with the shifting element S4 and that can be engaged by means of the reverse-gear gearset RG are of course present, but not taken further into account in the table since they are not relevant to the invention.

The gear table of FIG. 2 makes clear that in particular the gearshift between the seventh gear, namely the direct gear in the lower gear range GPL and the eighth gear, i.e. the first gear in the upper range, is a power-shift change since the two gears can be engaged simultaneously and the shift is carried out only by means of the clutch C1, C2. Decisive in this is the fact that in the eighth gear the force flow connection to the transmission output shaft 30 passes via the functional connection of the outer transmission input shaft 23 by way of the countershafts 2, 3 and the direct connection of the second hollow shaft 25 to the planetary carrier 29, whereas in the seventh gear the force flow connection to the transmission output shaft 30 passes via the direct connection between the inner transmission input shaft 22 and the main transmission shaft 24 and the functional connection of the main transmission shaft 24 by way of the planetary gearset 28.

Furthermore, the gear table of FIG. 2 shows that until the gearshifts 3rd gear to 4th gear and 10th gear to 11th gear all the other gearshifts can be power-shifted. However, since the two traction-force-interrupted gearshifts mentioned do not involve a gear range change, they can be carried out relatively quickly and are therefore less disconcerting for the driver. In addition gears nine and ten are engaged by way of the hollow shaft 25 and the planetary carrier 29, since their force flow branches via the first gear 1G which is arranged on the hollow shaft 25. The shifting element S6 is first shifted in the 11th gear. The highest gear, i.e. the fourteenth gear, is the direct gear of the transmission with transmission structure 1 as a whole.

Figure 3:
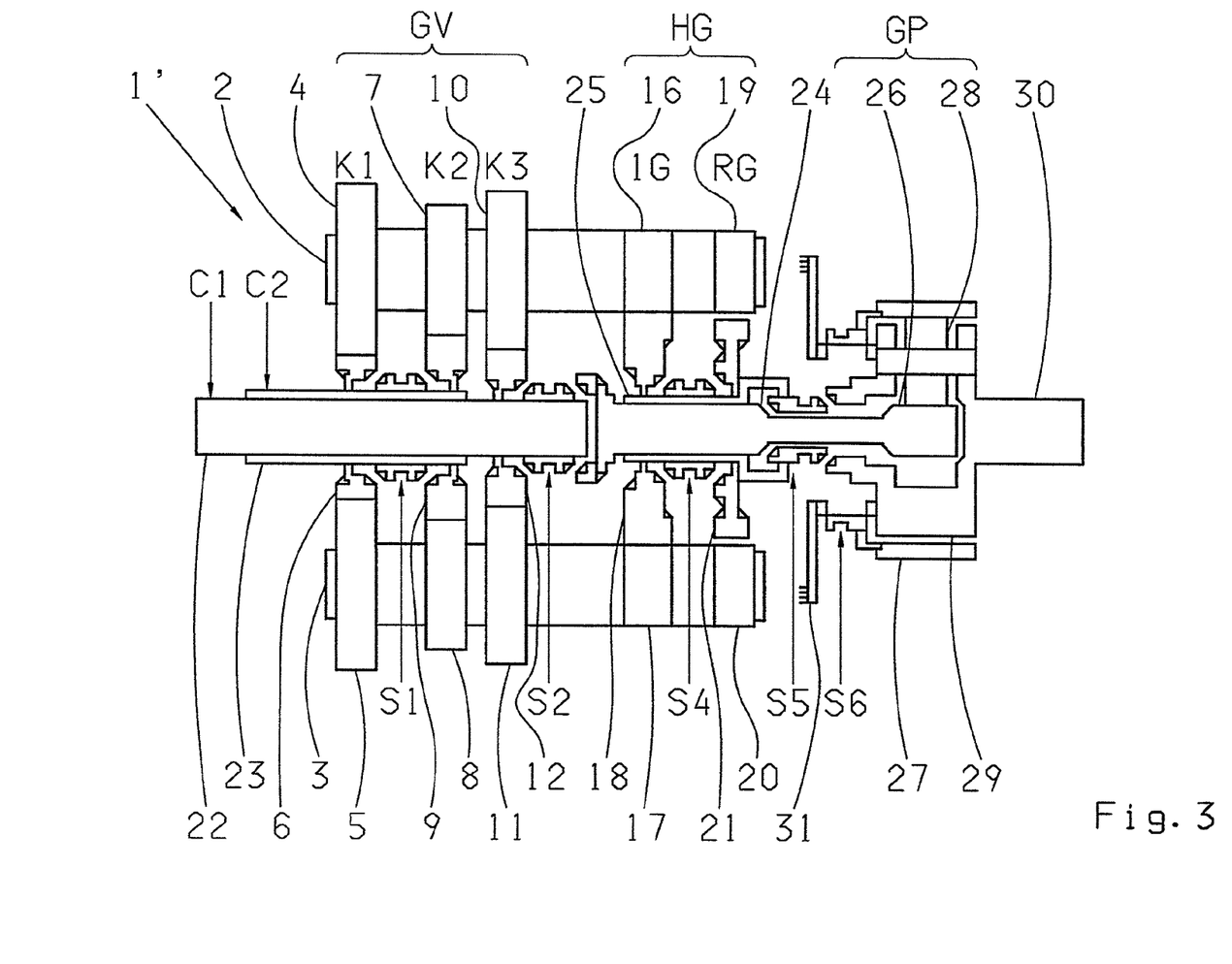
FIG. 3: A second transmission structure of a dual-clutch group transmission according to the invention with eight gears.

FIG. 3 shows a similar transmission structure 1' which, however, only has eight gears. For simplicity, in FIG. 3 comparable components are given the same indexes as in FIG. 1. An essential difference is the omission of the second gear 2G of the main group HG and of the shifting element S3. Furthermore, the shifting element S5 is arranged on the main transmission shaft 24 and can be actuated on both sides. Optionally, it forms a rotationally fixed connection between the hollow shaft 25 and the main transmission shaft 24, or between the hollow shaft 25 and the planetary carrier 29.

The mode of operation of the transmission structure 1' is comparable with that of the transmission structure 1 shown in FIG. 1. However, this transmission can be fully power-shifted, as can be seen from the associated gear table shown in FIG. 4.

Figure 4:
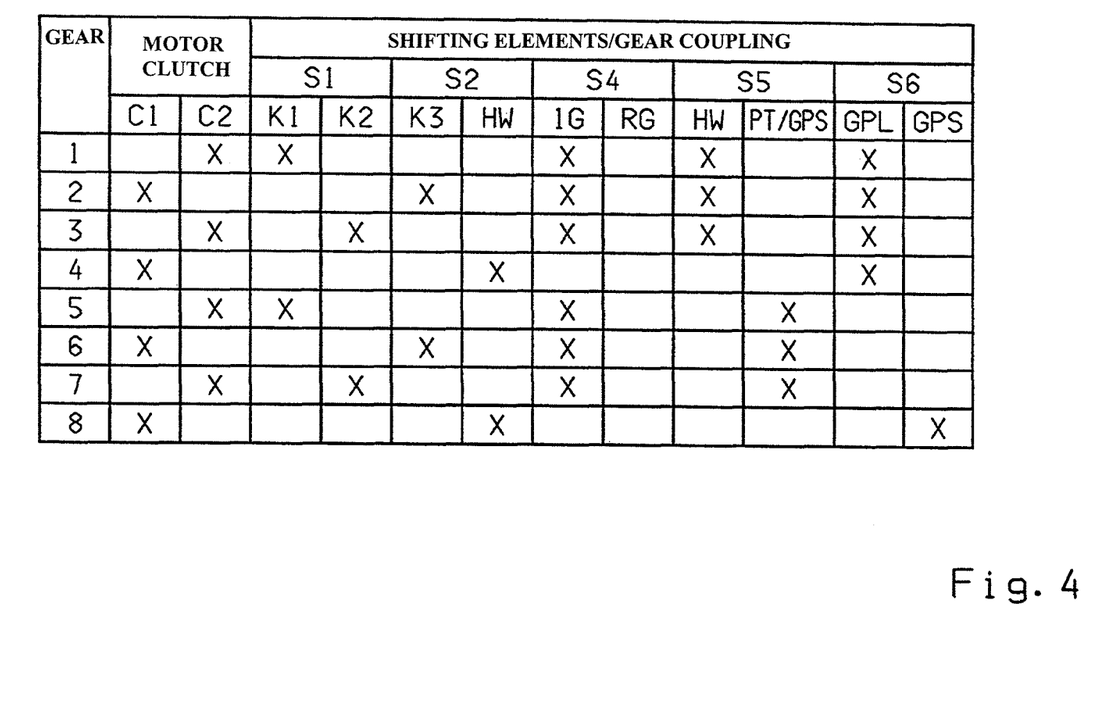
FIG. 4: A gear table for the eight-gear transmission structure

The direct gear in the slower, lower gear range GPL is the fourth gear. The gearshift from the fourth gear to the fifth gear, with a gear range change to the faster, upper gear range GPS is again power-shifted with the help of the connection of the hollow shaft 25 to the planetary carrier 29. The gearshift involves the same shift positions or force flow connections as in the comparable, already explained gearshift from the 7th gear to the 8th gear of the transmission structure 1.

Gears five, six and seven are also engaged by way of the hollow shaft 25 and the planetary carrier 29, since their force flow again branches via the first gear 1G which is arranged on the hollow shaft 25. Only for the eighth gear, as the direct gear of the transmission with transmission structure 1' as a whole, is the shifting element S6 shifted to the corresponding shift position GPS.

Indexes 1, 1' Transmission structure
2 Countershaft
3 Countershaft
4 Fixed wheel of the first gear constant
5 Fixed wheel of the first gear constant
6 Loose wheel of the first gear constant
7 Fixed wheel of the second gear constant
8 Fixed wheel of the second gear constant
9 Loose wheel of the second gear constant
10 Fixed wheel of the third gear constant
11 Fixed wheel of the third gear constant
12 Loose wheel of the third gear constant
13 Fixed wheel of the second main group gear
14 Fixed wheel of the second main group gear
15 Loose wheel of the second main group gear 16 Fixed wheel of the first main group gear
17 Fixed wheel of the first main group gear
18 Loose wheel of the first main group gear
19 Fixed wheel of the reversing gear
20 Fixed wheel of the reversing gear
21 Loose wheel of the reversing gear
22 Inner transmission input shaft
23 Outer transmission input shaft
24 Main transmission shaft
25 Hollow shaft
26 Sun gear
27 Ring gear
28 Planetary gearset
29 Planetary carrier
30 Transmission output shaft
31 Housing component
1G First main group gear
2G Second main group gear
C1 First clutch on the input side
C2 Second clutch on the input side
GV Splitter group
GP Range group
GPL Lower gear range
GPS Upper gear range
HG Main group
HoW Hollow shaft 25
HW Main transmission shaft 24
K1 First gear constant
K2 Second gear constant
K3 Third gear constant
RG Reversing gear
S1 First shifting element
S2 Second shifting element
S3 Third shifting element
S4 Fourth shifting element
S5 Fifth shifting element
S6 Sixth shifting element
PT Planetary carrier 29

The invention claimed is:

1. A dual-clutch group transmission comprising a splitter group (GV), a main group (HG) and a range group (GP) all arranged in a drive-train axially one after another,
the splitter group (GV) and the main group (HG) being formed as countershaft transmissions with at least one common countershaft (2, 3) and with at least one of a plurality of gear constants (K1, K2, K3) and gears (1G, 2G, RG),
the range group (GP) being a planetary transmission with a radially outer ring gear (27), a central sun gear (26) and a planetary gearset (28) located therebetween, and planetary wheels of the planetary gearset being guided by a planetary carrier (29),
an inner transmission input shaft (22) being connected on an input side to a first clutch (C1),
an outer transmission input shaft (23) being made as a hollow shaft arranged coaxially over the inner transmission input shaft (22) and connected, on an input side, to a second clutch (C2),
a main transmission shaft (24) being arranged axially adjacent the inner and the outer transmission input shafts (22, 23) and connected to the central sun gear (26),
a transmission output shaft (30) being is arranged axially adjacent the main transmission shaft (24) and connected, on an output side, to the planetary carrier (29),
shifting elements (S1, S2, S3, S4, S5, S6) for either engaging gears or forming frictional connections so that, via a first shifting element (S2), the inner transmission input shaft (22) being directly connectable to the main transmission shaft (24),
an additional hollow shaft (25) being arranged coaxially over the main transmission shaft (24),
at least one loose wheel (18), of a forward gear (1G) of the main group (HG), being rotatably mounted on the additional hollow shaft (25) and being connectable, in a rotationally fixed manner, to the additional hollow shaft by a second shifting element (S4),
the additional hollow shaft (25) being connectable by either a third or a fourth shifting element (S3, S5) to the main transmission shaft (24) and, by the fourth shifting element (S5), to the planetary carrier (29),
the splitter group (GV) having first, second and third gear constants (K1, K2, K3), of which the first and the second gear constants (K1, K2) being arranged on the outer transmission input shaft (23), and the third gear constant (K3) being arranged on the inner transmission input shaft (22),
the main group (HG) having first and second forward gears (1G, 2G) and one reverse gear (RG), of which the first gear (1G) and the reverse gear (RG) being arranged on the additional hollow shaft (25) and the second gear (2G) being arranged on the main transmission shaft (24), and
the range group (GP) being shiftable between a lower, geared range (GPL) and an upper, direct-gear range (GPS).

2. The dual-clutch group transmission according to claim 1, wherein a direct gear of the countershaft transmission (GV, HG) is preselected by forming a rotationally fixed direct connection of the inner transmission input shaft (22) to the main transmission shaft (24) and, at the same time, a gear adjacent to the direct gear is preselected by forming a rotationally fixed connections between another loose wheel (6, 9) of one of the driving gear constants and the outer transmission input shaft (23), between the loose wheel (18) of the driven forward gear and the additional hollow shaft (25), and between the planetary carrier (29) and the additional hollow shaft (25).

3. The dual-clutch group transmission according to claim 1, wherein the additional hollow shaft (25) is connectable, in a rotationally fixed manner, to the planetary carrier (29) by the fourth shifting element (S5) arranged on the additional hollow shaft and which is actuatable, on one side, and to the main transmission shaft (24) by the third shifting element (S3) arranged on the main transmission shaft (24) and which is actuatable on either one or both sides.

4. The dual-clutch group transmission according to claim 2, wherein the splitter group (GV), the main group (HG) and the range group (GP) provide a total of fourteen gears such that seventh gear is engaged as a direct gear in the lower, geared range (GPL) and fourteenth gear is engaged as a direct gear in the upper direct-gear range (GPS), and eight gear, ninth gear and tenth gear are engaged by way of the planetary carrier (29).

5. A dual-clutch group transmission comprising a splitter group (GV), a main group (HG) and a range group (GP) all arranged in a drive-train axially one after another,
the splitter group (GV) and the main group (HG) being formed as countershaft transmissions with at least one common countershaft (2, 3) and with at least one of a plurality of gear constants (K1, K2, K3) and gears (1G, 2G, RG),
the range group (GP) being a planetary transmission with a radially outer ring gear (27), a central sun gear (26) and a planetary gearset (28) located therebetween, and planetary wheels of the planetary gearset being guided by a planetary carrier (29), an inner transmission input shaft (22) being connected, on an input side, to a first clutch (C1), with an outer transmission input shaft (23) being made as a hollow shaft arranged coaxially over the inner transmission input shaft (22) and connected, on an input side, to a second clutch C2), a main transmission shaft (24) being arranged axially adjacent the inner and the outer transmission input shafts (22, 23) and connected to the central sun gear (26), a transmission output shaft (30) being arranged axially behind the main transmission shaft (24) and connected, on an output side, to the planetary carrier (29), shifting elements (S1, S2, S4, S5, S6) for either engaging gears or forming frictional connections so that, via a first shifting element (S2), the inner transmission input shaft (22) being directly connectable to the main transmission shaft (24), an additional hollow shaft (25) being arranged coaxially over the main transmission shaft (24), at least one loose wheel (18), of a forward gear (1G) of the main group (HG), being rotatably mounted on the additional hollow shaft (25) and being connectable, in a rotationally fixed manner, to the additional hollow shaft by a second shifting element (S4), the additional hollow shaft (25) being connectable by either a third or a fourth shifting element (S2, S5) to the main transmission shaft (24) and, by the fourth shifting element (S5), to the planetary carrier (29), the splitter group (GV) having first, second and third gear constants (K1, K2, K3), of which the first and the second gear constant (K1, K2) being arranged on the outer transmission input shaft (23), the range group (GP) being shiftable between a lower, geared range (GPL) and an upper, direct-gear range (GPS), a third gear constant (K3) being arranged on the inner transmission input shaft (22), the main group (HG) having one forward gear (1G) and one reverse gear (RG), which are arranged on the additional hollow shaft (25), the range group (GP) being shiftable between a lower, geared range (GPL) and an upper, direct-gear range (GPS).

6. The dual-clutch group transmission according to claim 5, wherein the additional hollow shaft (25) is connectable, in a rotationally fixed manner, by the fourth shifting element (S5), to the planetary carrier (29) and to the main transmission shaft (24), and the fourth shifting element (S5) is arranged on the main transmission shaft (24) and is actuated on both sides.

7. The dual-clutch group transmission according to claim 5, wherein the splitter group (GV), the main group (HG) and the range group (GP) have a total of eight forward gears, such that a fourth gear is engaged as a direct gear in the lower, geared range (GPL) and the eighth gear is a direct gear in the upper, direct-gear range (GPS), and fifth gear, six gear and seven gear are engaged by the planetary carrier (29).

8. A dual-clutch group transmission comprising:
a splitter group (GV), a main group (HG) and a range group (GP) being axially sequentially arranged in a drive-train, the splitter group (GV) and the main group (HG) being countershaft transmissions which together comprise at least one common countershaft (2, 3), first, second and third gear constants (K1, K2, K3), a first forward gear (1G) and a reverse gear (RG);

the range group (GP) being a planetary transmission comprising a ring gear (27), a sun gear (26) and a carrier (29), the carrier (29) supporting planets gears which couple the ring gear (27) and the sun gear (26) and the carrier being continuously connected to a transmission output shaft (30);

a hollow transmission input shaft (23) and an inner transmission input shaft (22) being coaxially arranged such that the inner transmission input shaft (22) extends axially through the hollow transmission input shaft (23), a first clutch (C1) being connected to an input end of the inner transmission input shaft (22) and a second clutch (C2) being connected to an input end of the hollow transmission input shaft (23);

a main transmission shaft (24) being coaxially aligned with the inner and the hollow transmission input shafts (22, 23) with an input end of the main transmission shaft being adjacent to ends of the inner and the hollow transmission input shafts (22, 23) that are opposite to input ends of the inner and the hollow transmission input shafts (22, 23), an output end of the main transmission shaft (24) being continuously connected to the sun gear (26), the transmission output shaft (30) being coaxially aligned the main transmission shaft (24), at least first, second, third and fourth shifting elements (S1, S2, S4, S5, S6) for either engaging gears or forming frictional connections, the first shifting element (S2), directly coupling the inner transmission input shaft (22) to the main transmission shaft (24);

a hollow output shaft (25) being coaxially aligned with the main transmission shaft (24) and the main transmission shaft (24) axially passes through the hollow output shaft (25), a loose wheel (18) of the first forward gear (1G) being rotatably supported by the hollow output shaft (25) and being connectable, via the second shifting element (S4), to the hollow output shaft (25) in a rotationally fixed manner;

the hollow output shaft (25) being connectable by the third shifting element (S5) to the transmission output shaft (30); and the splitter group (GV) comprising the first, the second and the third gear constants (K1, K2, K3), the first and the second gear constant (K1, K2) are rotatably supported by the hollow transmission input shaft (23), the range group (GP) being shiftable between a low range (GPL) and a high range (GPS) and the third gear constant (K3) being rotatably supported by the inner transmission input shaft (22), and the main group (HG) comprising the forward gear (1G) and the reverse gear (RG), which are rotationally supported on the hollow output shaft (25).

* * * * *